(12) United States Patent
Bergsma

(10) Patent No.: US 6,990,862 B2
(45) Date of Patent: Jan. 31, 2006

(54) HERMETIC FUEL LEVEL SENDER HAVING TANK BOTTOM REFERENCING

(75) Inventor: Rudolph Bergsma, deceased, late of Ann Arbor, MI (US); by Rosemary Bergsma, legal representative, Ann Arbor, MI (US)

(73) Assignee: Rudolph Bergsma Trust, Ann Arbor, MI (US), dated Jul. 13, 1984, as amended and restated ( * ) Notice: Subject to any disclaimer, the term of this patent is extended or adjusted under 35 U.S.C. 154(b) by 0 days.

(21) Appl. No.: 10/704,027

(22) Filed: Nov. 7, 2003

(65) Prior Publication Data

US 2005/0072229 A1    Apr. 7, 2005

Related U.S. Application Data

(60) Provisional application No. 60/425,770, filed on Nov. 13, 2002, provisional application No. 60/370,058, filed on Apr. 4, 2002, provisional application No. 60/360,337, filed on Feb. 26, 2002.

(51) Int. Cl.
*G01F 23/32* (2006.01)

(52) U.S. Cl. .............................. 73/317; 73/313; 73/305
(58) Field of Classification Search .............. 73/290 R, 73/313, 317, 309, 314, 305
See application file for complete search history.

(56) References Cited

U.S. PATENT DOCUMENTS

| | | | | |
|---|---|---|---|---|
| 3,449,955 A | * | 6/1969 | Stadelmann | 73/313 |
| 3,731,805 A | * | 5/1973 | Schniers | 210/86 |
| 3,925,747 A | * | 12/1975 | Woodward et al. | 338/33 |
| 4,627,283 A | * | 12/1986 | Nishida et al. | 73/313 |
| 4,939,932 A | * | 7/1990 | Ritzenthaler et al. | 73/317 |
| 5,085,078 A | * | 2/1992 | Baux et al. | 73/313 |
| 5,284,055 A | * | 2/1994 | Baux et al. | 73/317 |
| 5,666,851 A | * | 9/1997 | Bacon | 73/317 |
| 6,230,690 B1 | * | 5/2001 | Umetsu | 123/509 |
| 6,508,121 B2 | * | 1/2003 | Eck | 73/317 |

OTHER PUBLICATIONS

NTSB Abstract AAR-00/03: Abstract of the Aircraft Accident Report of TWA Flight 800.*

* cited by examiner

*Primary Examiner*—Hezron Williams
*Assistant Examiner*—Rodney Frank
(74) *Attorney, Agent, or Firm*—George L. Boller

(57) ABSTRACT

A fuel level sender (26) for signaling liquid fuel level in a fuel tank (22). An enclosure (31) forming a hub of the sender provides an interior that is hermetically sealed against intrusion of fuel vapor and liquid. An actuator (110, 122) is positionable on the enclosure exterior in correlation with liquid fuel level. A movement (52) within the enclosure interior follows the positioning of the actuator. An electric circuit element (62; 86) within the enclosure interior is operated by the movement to provide an electric characteristic for transmission through the enclosure to signal liquid fuel level. A bottom reference rod (150) and stop (152) position the enclosure circumferentially within its mounting in a fuel pump module to cause the circuit element to signal zero fuel level when the stop is on the tank bottom wall and the actuator is in position corresponding to zero fuel level in the tank.

10 Claims, 7 Drawing Sheets

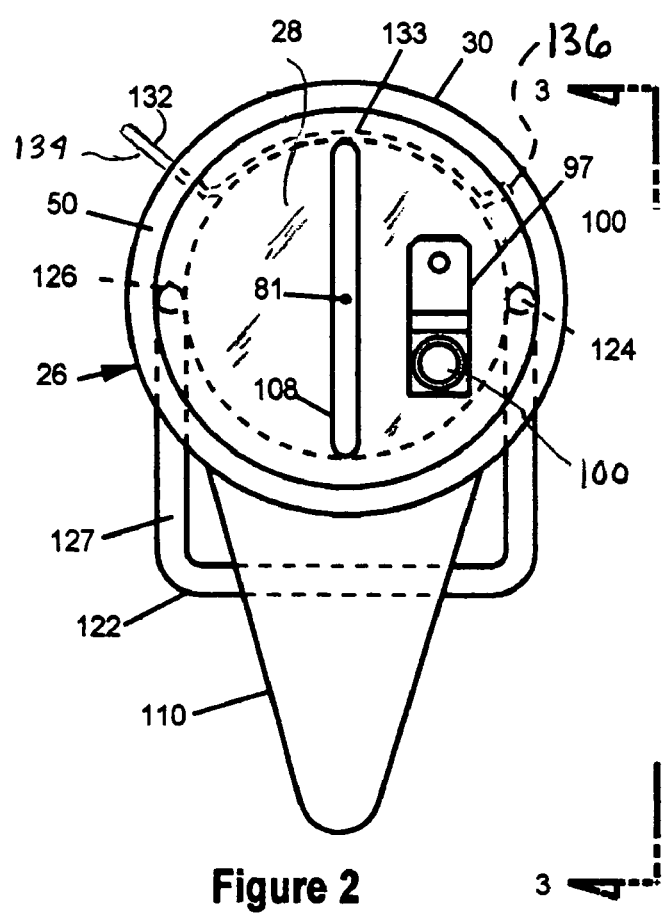
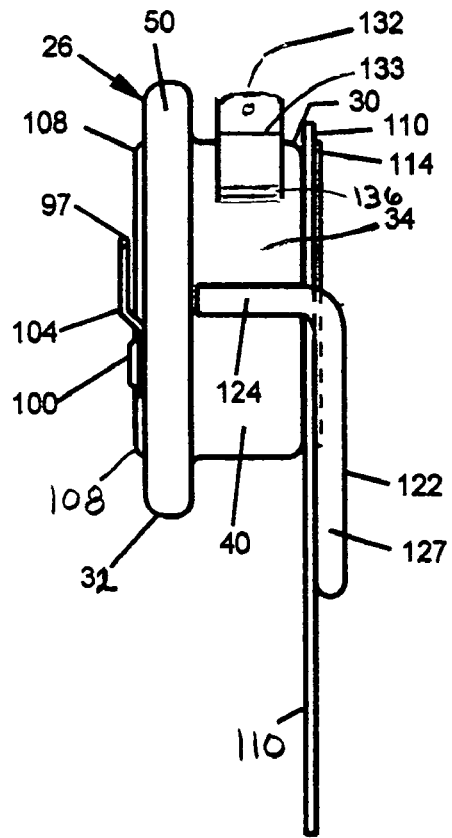
Figure 2
Figure 3

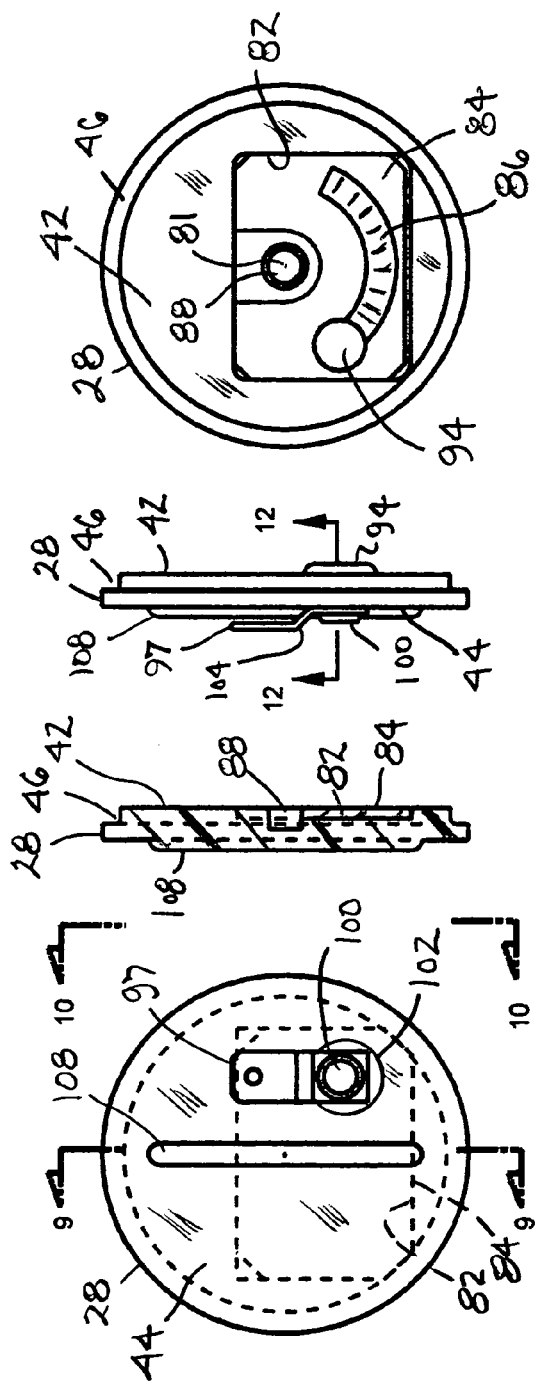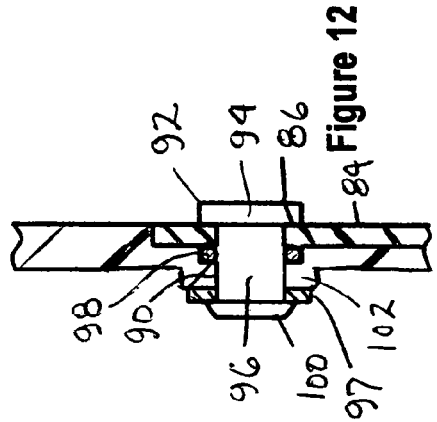

HERMETIC FUEL LEVEL SENDER HAVING TANK BOTTOM REFERENCING

REFERENCE TO RELATED APPLICATIONS AND PRIORITY CLAIMS

This non-provisional application derives from the following patent applications, the priorities of which are expressly claimed: Non-Provisional application Ser. No. 10/373,955 filed 26 Feb. 2003 claiming the priorities of Provisional Application No. 60/360,337, filed on 26 Feb. 2002, and Provisional Application No. 60/370,058, filed on 4 Apr. 2002; and Provisional Application No. 60/425,770, filed on 13 Nov. 2002.

FIELD OF THE INVENTION

This invention relates to float-operated senders that are associated with fuel tanks of motor vehicles to transmit a value of a parameter representing the level of liquid fuel in a tank to instrumentation that uses the value to operate a display that presents information related to the level of fuel in the tank to a driver of the vehicle.

BACKGROUND OF THE INVENTION

One type of sender that is used in motor vehicles comprises a resistor card that is disposed in a fuel tank in a manner that exposes it to whatever fuel is used by the vehicle (gasoline and/or alcohol for example), including fuel additives, sour gas, and/or contaminants. The sender is operated by a float that follows the level of liquid fuel in the tank. As the float assumes different levels within the tank, its motion is transmitted by a float rod, or arm, to a contact arm, causing a contact on the arm to move along a succession of commutator bars extending from locations along the length of a resistor track printed on a resistor card, thereby selecting a portion of the resistor in correlation with the level of the float. The selected portion provides a variable resistance that is electrically connected with instrumentation that operates a fuel gauge that can be observed by the driver. The float rod is mounted for pivotal movement via a bearing, and the float is disposed at an end of the rod opposite the bearing. As the float moves, the rod imparts pivotal motion to the contact arm, causing its contact to move in an arc along the succession of commutator bars, changing the value of the variable resistance as it moves. In that design for a resistive type fuel level sender, the commutator bar contact produces a result similar to a contact moving in an arc along a potentiometer or variable resistor track, changing the value of the variable resistance as it moves.

The force that the contact is able to apply against the resistor on the resistor card is important in enabling the sensor to provide a service life that will meet relevant specifications. Over the life of a sender the force that the contact exerts on the resistor may vary for one or more different reasons, such as fuel slosh in the tank and/or looseness in the bearing. The use of a silver palladium alloy as the resistor commutator may reduce the effects of those factors. Nonetheless the contact may at times lose contact with the resistor, creating a momentary open circuit. Events that may cause such open circuits include intrusion of foreign particles between the contact and the resistor, corrosion of the commutator, oxidized fuel coating, and high-G loads experienced by the sender. Momentary open circuits create excess wear on the contact and the resistor commutator.

A sender that precludes those undesirable possibilities and that meets certain cost objectives is therefore seen to be a desirable improvement.

The durability and accuracy of a fuel sender are also important, especially where a motor vehicle manufacturer warrants a fuel system and/or its components either for legal compliance and/or by competitive considerations. Failure to meet relevant compliance criteria can expose a motor vehicle manufacturer to costly penalties and/or warranty claims.

Accordingly, it is believed that a sender that provides both increased durability and accuracy over an extended period would be a significant improvement in the state of the art.

U.S. Pat. Nos. 3,739,641 and 4,987,400 describe gauges having magnetically driven senders in which the contacts are housed within sealed enclosures. The gauge of U.S. Pat. No. 3,739,641 is sealed against intrusion of volatile vapors that may accumulate from many sources and might ignite from a spark. An example given is in the bilge of a marine vessel. The gauge of U.S. Pat. No. 4,987,400 is said to be ultrasonically sealed for withstanding at least eight inches of mercury pressure differential. Both patents teach the use of an external magnet driving a magnet internal to the enclosure where the magnet is rotated by a coupling to a float. The enclosure materials are not selected to be highly impermeable to fuel or fuel vapors, only sufficient to prevent spark ignition.

Considerations in the prevailing design of motor vehicle fuel systems either tacitly or explicitly mandate that the fuel sender be contained within the fuel tank where it may at times be immersed in liquid fuel. A contact-containing enclosure that is external to a tank, as in U.S. Pat. Nos. 3,739,641 and 4,987,400, is not seen to be suitable for placement in a fuel tank of a motor vehicle where it must withstand immersion in a hostile liquid fuel that can at some times be quite hot and at others, quite cold, and that may contain various contaminants, additives, foreign substances, etc.

Accordingly, it is believed that an in-tank fuel sender for a motor vehicle that maintains its accuracy when exposed to liquid fuels, especially liquid fuels like gasoline, over an extended period would be another significant improvement in the state of the art.

Prevailing fuel system design practices in the automotive industry employ a fuel pump module that is assembled into a fuel tank, typically through an opening in a top wall of the tank that is subsequently closed. A fuel sender is typically part of the fuel pump module. Certain of the known systems comprise a fixed mounting of the sender in an assembly that is installed in a tank. The assembly has a construction that forces its lower end against a bottom wall of the tank thereby bodily positioning the sender within the tank relative to the bottom wall.

Accordingly, an in-tank fuel sender that can be conveniently assembled into fuel pump modules is also seen as desirable.

Non-Provisional application Ser. No. 10/373,955, filed 26 Feb. 2003, discloses a novel fuel sender for a motor vehicle fuel tank that possesses features and characteristics that render the sender suitable for in-tank placement in a motor vehicle fuel system where it is exposed to liquid fuel, including convenient mounting on a fuel pump module; that endow the sender with continued accuracy over an extended period, enabling it to comply with increasingly stringent specifications; and that make the sender quite cost-effective considering the increasingly stringent demands that may be imposed on it by motor vehicle manufacturers.

The disclosed embodiment of that Application comprises a central hub comprising a sealed enclosure in which a contact arm and a resistor card are disposed. The enclosure is preferably filled with a non-conducting fluid, such as light oil. Force of a contact on the contact arm against a commutator or track on the resistor card will be essentially insensitive to influences, such as particle intrusion and fuel slosh, that otherwise might cause momentary open circuits, with contact-to-resistor card force remaining more consistent over the useful life of the sender. Contact-to-resistor card arcing is unlikely, but any arcing that might occur, such as due to a high-G force, will not be exposed to fuel or fuel vapor.

The enclosure is formed by a low permeable casing, or housing, preferably a stainless steel, and a low permeable cover, preferably a non-metallic, fuel-tolerant synthetic material, which may be either transparent or opaque. The housing has a circular back, or rear, wall and a circular perimeter wall that extends forward from and perpendicular to the rear wall. The forward margin of the perimeter wall is crimped over a circular outer edge of the cover to forcefully hold the circular outer margin of the cover against a circular shoulder formed in an intermediate portion of the housing perimeter wall. A sealing gasket that is disposed between the housing shoulder and the cover margin seals the joint between the cover and housing in a manner that prevents both liquid fuel and fuel vapor from intruding into the enclosure interior that is cooperatively formed by the assembled cover and housing. Any method of sealing must take into consideration sealing against fuel vapor, as well as liquid fuel.

When installed within a fuel tank, the sender is disposed in an orientation that places a main center axis of the hub enclosure in a desired orientation. The hub is fixedly mounted in any suitable manner, such as by attachment to a wall of a fuel pump module. A movement actuating member that is external to the sealed enclosure and operated by a fuel level float is positionable relative to the central hub in correspondence with fuel level sensed by the float. As the float moves vertically up and down with changing fuel level in the tank, the movement actuating member is correspondingly positioned in relation to the sealed enclosure.

The contact arm is positioned by a movement within the interior of the sealed enclosure. The movement is supported within the enclosure for turning about the main center axis and forms one portion of a magnetic circuit whose other portion is formed by the movement actuating member. The movement and the movement actuating member are magnetically coupled such that the movement is forced to turn within the enclosure in correspondence with positioning of the movement actuating member relative to the exterior of the enclosure. In this way the movement is forced to follow the actuating member, and hence follow the level of liquid fuel in the tank.

The movement moves the contact arm contact along the commutator, or track on the resistor card to change the resistance that is presented to an electric circuit connected to the sender. In this way, the sender enables the circuit to operate a fuel gauge that indicates to a driver of the motor vehicle the amount of fuel in the tank.

The movement provides the source of magnetism, while the movement actuating member comprises a magnetically conductive material. Turning of the movement actuating member causes substantial follower torque to be applied to the movement, thereby causing the movement to follow the turning of the actuating member with low hysteresis. Those features, in conjunction with the isolation of the commutator, its contact, and the resistor from fuel, enable the sender to perform with consistency and accuracy during the course of its useful life.

The mounting of in-tank fuel senders in mass-produced automotive vehicle fuel tanks results in some tank-to-tank variation in the distance at which a sender is disposed above a bottom wall of a tank. Even when that distance is fairly well controlled by control of the dimensional tolerances of the parts involved, small differences can give rise to significant differences in accuracy of the reading on a fuel gauge that is presented to the driver. The fuel pump module may also change position within the tank during the life of the vehicle due to various effects such as those caused by impact on the vehicle from an external source. Improvements in accuracy of such readings can be important in mass-produced motor vehicles where such vehicles include trip computers having display features such as "miles to empty".

Various forms of "bottom referencing" have been heretofore proposed. Examples are found in U.S. Pat. Nos. 5,167,156; 5,666,851; and 6,508,121.

SUMMARY OF THE INVENTION

The present invention relates to a novel in-tank fuel level sender that can alleviate the effect on fuel gauge accuracy of the above-discussed tank-to-tank variations in positioning of the sender from the tank bottom wall. The invention accomplishes this objective by a bottom referencing feature that references the sender to the tank bottom wall. The sender also incorporates the hermetic sealing described in Non-Provisional application Ser. No. 10/373,955 filed 26 Feb. 2003.

A general aspect of the invention therefore relates to an in-tank fuel level sender for signaling the level of liquid fuel in a motor vehicle fuel tank. An enclosure forming a hub of the sender provides an interior that is hermetically sealed against intrusion of fuel, both liquid and vapor. An actuator, such as a float rod and float, is positionable on an exterior of the enclosure in correlation with liquid fuel level. A movement within the interior of the enclosure follows the positioning of the actuator. An electric circuit element within the interior of the enclosure is operated by the movement to provide an electric characteristic for transmission through the enclosure to signal the liquid fuel level. The hermetically sealed enclosure is disposed in a mounting, such as in a fuel pump module, for some degree of turning about an axis. A bottom reference rod extends from the enclosure exterior toward the bottom wall of the tank and tends to turn the enclosure in one sense about the turning axis in the mounting. In its installed position in a tank, the sender is disposed such that the bottom reference rod rests on the tank bottom wall at a distance from the turning axis to circumferentially position the enclosure in its mounting about the turning axis. The float rod and float position operate the movement according to the fuel level in the tank. Because of the ability of the enclosure to be positioned in its mounting by the bottom reference rod, the electric characteristic presented by the sender is rendered essentially independent of the distance of the enclosure above the tank bottom wall, thereby essentially removing that distance as an influence on sender accuracy.

Another general aspect relates to a method of calibrating such a sender.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

BRIEF DESCRIPTION OF THE DRAWINGS

FIG. 2 is an enlarged rear view of the sender of FIG. 1 by itself, still in elevation, but with the float rod and float omitted and with a hub of the sender rotated counterclockwise a small amount and with an actuating plate of the sender in a different position for illustrative convenience.

FIG. 3 is a right side view of FIG. 2, looking along line 3—3 in FIG. 2 in the direction of the arrowheads.

FIG. 8 is a view in same direction as the view of FIG. 2 showing the cover separate from the sender.

FIG. 9 is a cross section view as viewed along line 9—9 in FIG. 8 in the direction of the arrowheads.

FIG. 10 is a right side view of the cover as viewed along line 10—10 in FIG. 8 in the direction of the arrowheads.

FIG. 11 is a rear view of FIG. 8.

FIG. 12 is an enlarged cross section view as viewed along line 12—12 in FIG. 10 in the direction of the arrowheads.

DESCRIPTION OF THE PREFERRED EMBODIMENT

Figure 1:
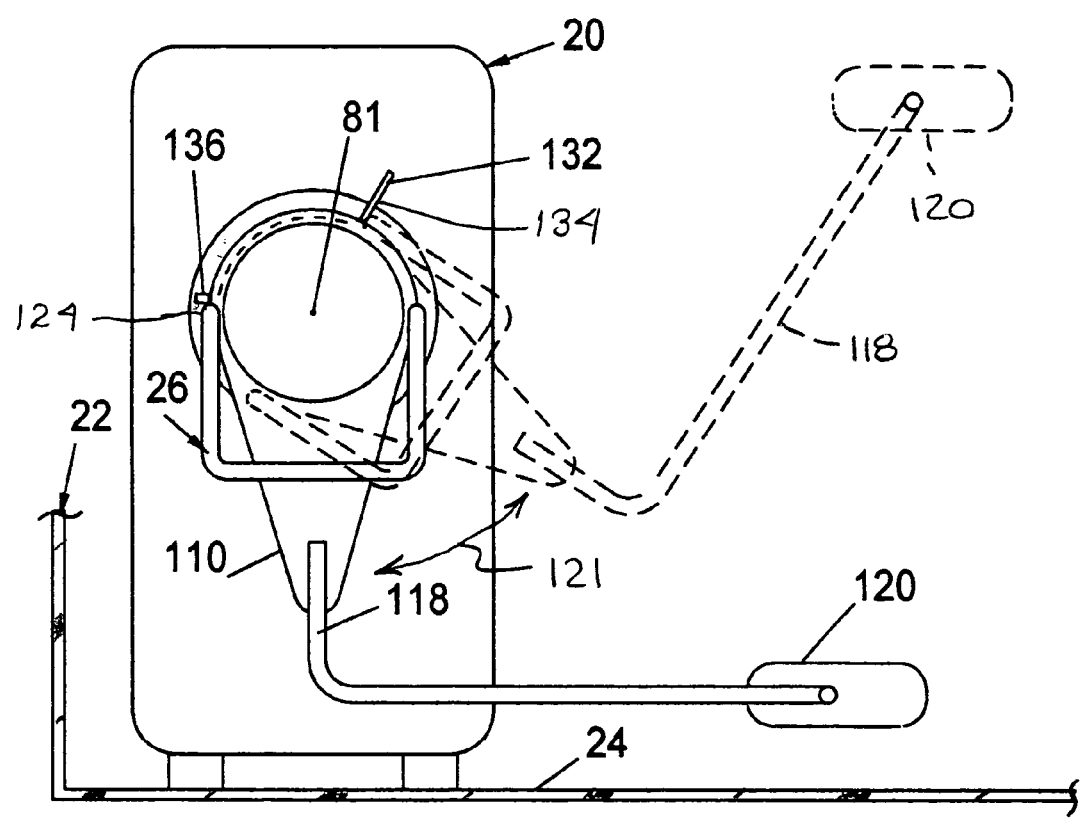
FIG. 1 is an elevation view of a fuel pump module disposed within a motor vehicle fuel tank and showing a front view of a sender, including a float rod and float, but without the bottom referencing feature.

FIG. 1 shows a portion of a fuel pump module 20 that has been placed within a fuel tank 22 through an opening in a top tank wall (not shown) that is subsequently closed. The base of module 20 rests on a bottom wall 24 of tank 22 to set the elevation, within the tank, of a fuel level sender 26 without bottom referencing.

Figure 7:
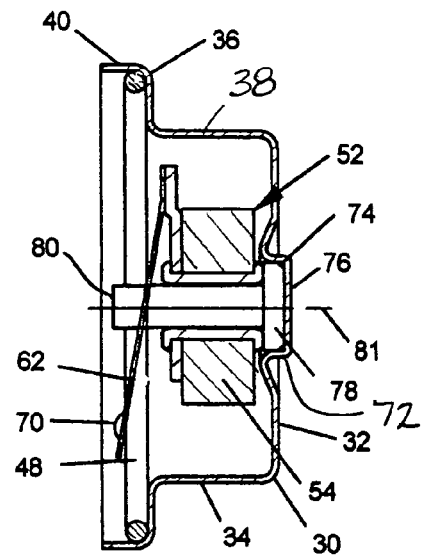
FIG. 7 is a cross section view along line 7—7 in FIG. 4 looking in the direction of the arrowheads.

FIGS. 2–5 show sender 26 to comprise a non-metallic cover 28 and a metal casing, or housing 30, that are assembled together to cooperatively form a sealed enclosure 31. Cover 28 is preferably a fuel-tolerant plastic, either transparent or opaque. Housing 30 is preferably a non-magnetic stainless steel that has been fabricated by drawing sheet stock into the general shape of a cup as shown by FIG. 7. The bottom of the cup forms a back, or rear, circular wall 32 and an immediately adjoining circular perimeter wall 34 that extends forward from rear wall 32. An intermediate portion of wall 34 comprises a circular shoulder 36 that separates a smaller diameter proximal portion 38 of wall 34 from a larger diameter distal wall portion 40 that forms the cup rim.

FIGS. 8–12 show cover 28 as essentially a circular disk that has an inner face 42, an outer face 44, and an outer margin that comprises a shouldered groove 46 on inner face 42. The outside diameter of cover 28 is slightly less than the circular inside diameter of distal wall portion 40 of housing 30. A circular sealing gasket 48 (FIG. 7) is disposed within the housing against shoulder 36. In preparation for assembly of cover 28 and housing 30, the housing is disposed with its rear wall facing vertically downward so that the open housing interior faces vertically upward. Such an orientation enables the interior of enclosure 31 to be filled with movement-damping and lubricating fluid, such as a light oil, if desired, by filling housing 30 before cover 28 is assembled to it.

Cover 28 is placed over housing 30 with inner face 42 facing and aligned with the open housing interior. The cover is then advanced, i.e. lowered, to fit the cover outer margin within wall portion 40 and seat groove 46 on gasket 48, thereby closing what would otherwise be the open front of the housing. Wall portion 40 is then rolled over, i.e. crimped, onto outer face 44, forcing the two parts 28, 30 together and compressing gasket 48 in the process to form sealed enclosure 31. The assembled condition can be seen in FIGS. 2 and 3 where the sealed joint that has been created endows the enclosure with a circular perimeter ridge 50 that can, if desired, be used for mounting the sender on module 20.

Figure 6:
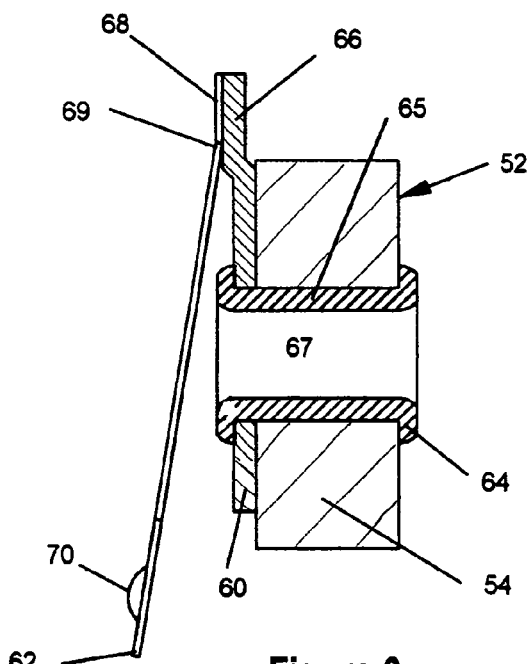
FIG. 6 is a view taken generally along line 6—6 in FIG. 4 in the direction of the arrowheads and on a larger scale.

Sender 26 comprises a movement, 52 shown by itself in FIG. 6. Movement 52 is housed within enclosure 31 as shown by FIG. 7. Movement 52 comprises a magnet 54 magnetized along its length (see FIG. 4 also) to provide respective North and South poles at opposite rounded tip ends 56, 58 respectively of the diameter of the movement. Magnet 54 has flat front and rear faces, giving it a uniform thickness, but it has a narrowing taper in the direction of each tip end. Movement 52 further comprises an electrically conductive contact arm mounting bracket 60 for mounting an electrically conductive contact arm 62 on magnet 54. An electrically conductive eyelet 64 holds the two parts 54, 60 together.

Before its association with parts 54, 60, eyelet 64 has a cylindrical shape, but with one end rolled over. Assembly of parts 54, 60 is accomplished by placing bracket 60 in front of the front face of magnet 54 with a through-hole 67 in the bracket aligned with a through-hole 65 in magnet 54, and then inserting the non-rolled-over end of eyelet 64 through the two aligned through-holes so that the non-rolled-over eyelet end protrudes rearward beyond the rear face of the magnet. Through-hole 65 is located at the center of magnet 54, midway between the magnet's tip ends 56, 58. The protruding rear end of the eyelet is then rolled over against the margin of through-hole 67 thereby forcing bracket 60 to be held flat against the front face of magnet 54 that is to confront inner cover face 42 in the completed sender.

Figure 4:
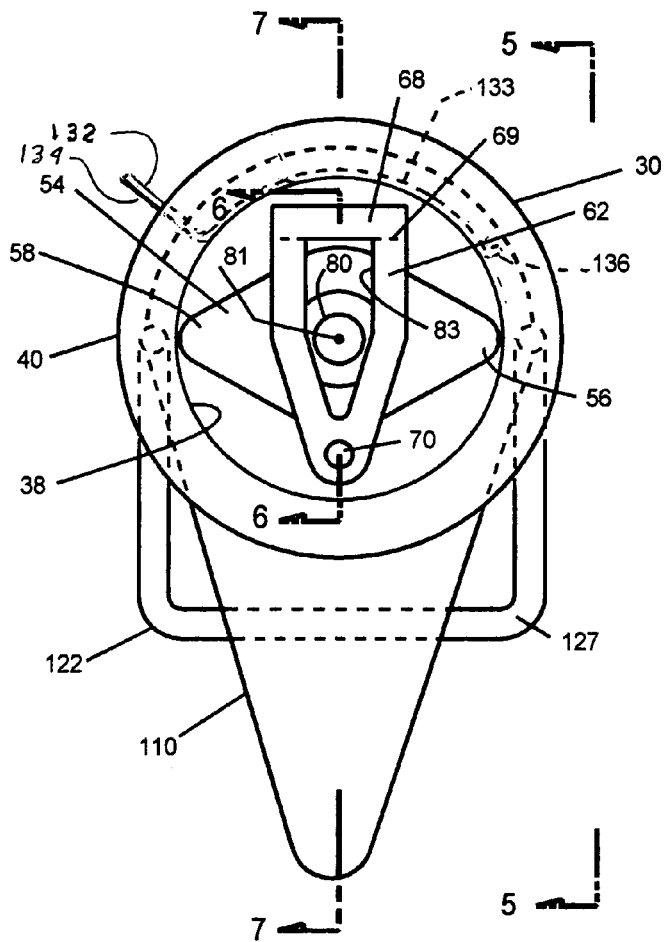
FIG. 4 is a view in the same direction as FIG. 2, but at a stage of fabrication of the sender where a cover is not yet in place, thereby allowing the interior of a movement-containing housing to be seen.
Figure 5:
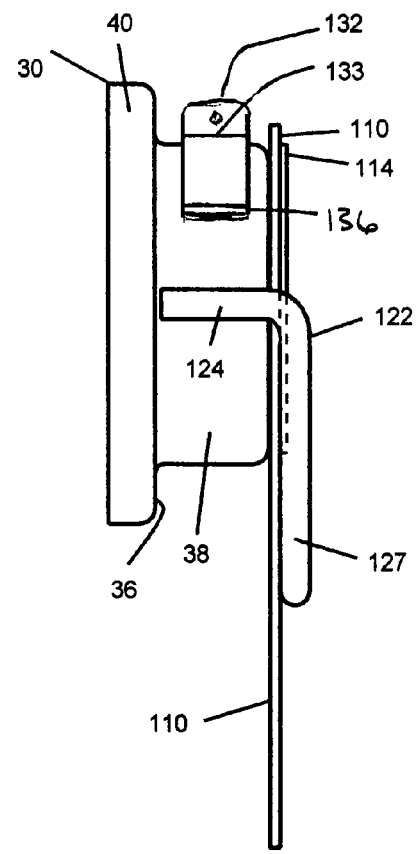
FIG. 5 is a right side view of FIG. 4, looking along line 5—5 in FIG. 4 in the direction of the arrowheads.

FIG. 4 shows that the length of contact arm mounting bracket 60 is at a right angle to that of magnet 54. FIGS. 6 and 7 show that one end of bracket 60 comprises a raised platform 66 to which a flat proximal end 68 of contact arm 62 is affixed, such as by welding in several spots. Contact arm 62 comprises a bend 69 that causes it to extend angularly away from end 68 in overlying relation to bracket 60. The tip, or distal, end of contact arm 62 comprises an electric contact 70 that can be either an integral formation in the arm, such as a dimple, one or more tines or fingers, or a separate contact element that is affixed to the arm by any suitable process.

FIG. 7 shows that rear housing wall 32 comprises an embossment 72 at its center. Embossment 72 is created during the drawing of the cup that forms housing 30. Embossment 72 is shaped to provide a circular depression, or pocket, 74 on the interior of enclosure 31 and a circular riser 76 on the exterior. Pocket 74 accurately and sturdily seats a circular head 78 of a post 80 so that the post extends within the enclosure along a central main axis 81 that is perpendicular to wall 32 and parallel to and concentric with perimeter wall portions 38, 40. Embossment 72 may be formed in a way that allows post 80 to be assembled to housing 30 by pressing head 78 into pocket 74. Additional means of attachment, such as welding or the like, may be used as appropriate.

As can be appreciated from consideration of FIG. 7, movement 52 is associated with housing 30 prior to placement of cover 28. With post 80 having been assembled to the housing, movement 52 is placed on post 80 by aligning eyelet 64 with the post and moving the two toward each other. Contact arm 62 has an aperture 83 (FIG. 4) that allows post 80 to pass through without interference. The placement of movement 52 on post 80 enables the movement to turn about axis 81.

Cover 28 is a molded synthetic part having several formations that are advantageous for the fabrication and operation of sender 26. Those formations can be seen in FIGS. 8–12. One formation is a shallow depression 82 in inner face 42 for locating a resistor card 84 on which a resistor 86 is disposed. A second formation is a small circular blind hole 88 at the center of face 42 into which the tip end of post 80 locates when the cover is assembled to housing 30.

A third formation shown in FIG. 12 comprises a shouldered through-hole 90 that provides for a sealed termination of resistor 86 to the exterior of enclosure 31 so that sender 26 can be connected to an electrical system that reads the fuel level signaled by the sender. The termination comprises an electrically conductive rivet 92 that passes through-hole 90. On the interior of enclosure 31, a head 94 of rivet 92 bears against an end of resistor 86. A shank 96 of the rivet extends from head 94, passing through a hole 95 in resistor card 84, through hole 90, and through a hole in the proximal end of an electric terminal 97 that is external to enclosure 31. An O-ring seal 98 seals the circumference of rivet shank to the wall of hole 90 proximate its shoulder. The distal end 100 of the rivet shank is rolled over to hold the proximal end of terminal 97 flat against a circular pad 102 that is locally raised on cover outer face 44 to complete this third formation in the cover. Terminal 97 comprises a step 104 leading to a blade 106 at its distal end adapted for mating connection with a wiring terminal (not shown) of the electrical system.

A fourth formation in cover 28 is a straight ridge 108 on front face 44 lying on a diameter of the cover but stopping short of the perimeter of the cover at both ends. Pad 102 and terminal 97 are disposed to one side of ridge 108, as shown by FIG. 8, with the length of blade 106 running parallel to ridge 108. Neither terminal 97 nor ridge 108 interfere with crimping of housing 30 to cover 28. As should be apparent, both terminal 97 and resistor card 84 are assembled to cover 28 prior to attachment of the cover to housing 30. As will become more apparent later from description of sender calibration, ridge 108 provides a feature for conveniently turning the cover on the housing prior to crimping of the housing to the cover.

As cover 28 and housing 30 are being assembled to form enclosure 31, contact 70 bears against resistor 86 with increasing pressure as the two parts move toward final position. Once the perimeter of cover 28 has engaged gasket 48, and the housing has been crimped to the cover, the angularly extending portion of arm 62 has been resiliently flexed to cause contact 70 to bear with a desired amount of force against resistor 86.

Figure 14:
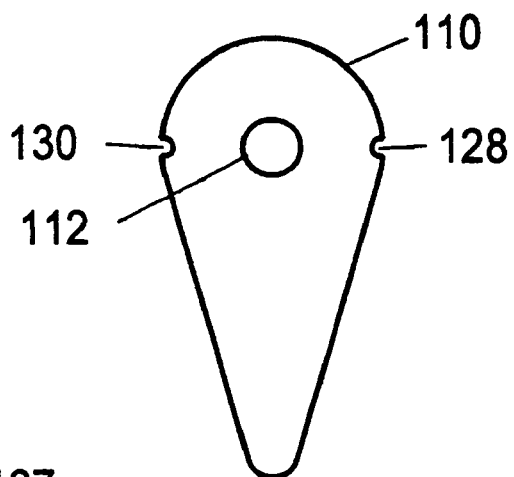
FIG. 14 is a plan view of the actuating plate of the sender shown by itself on substantially the same scale as FIG. 1.
Figure 15:
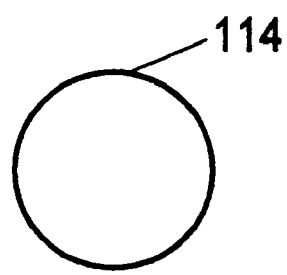
FIG. 15 is a plan view of a retainer of the sender shown by itself on substantially the same scale as FIG. 1.

Riser 76 of embossment 72 provides a bearing on which an actuating plate, or lever, 110 that is shown by itself in FIG. 14 can turn. Actuating plate 110 is essentially a flat non-magnetic metal plate, having a large end and a small end. The large end comprises a circular through-hole 112, that when the large end is placed behind and parallel with housing rear wall 32, and with hole 112 concentric with riser 76, allows the large end to be disposed against the rear housing wall with the riser fitting closely within hole 112. A circular retainer 114, shown by itself in FIG. 15, is then placed over the large end of actuating plate 110 to capture the latter on the housing. Riser 76 protrudes through hole 112 just enough to allow the center of retainer 114 to be disposed flat against the riser, and it is there that the retainer is secured by welding to the housing. Consequently, actuating plate 110 is captured on enclosure 31, but in a manner that allows it to freely turn on the housing riser about axis 81 with no significant looseness.

As can be seen in FIG. 1, one end of a suitably formed float rod, or arm, 118 is joined to actuating plate 110 in any suitably secure manner, such as welding, at a location spaced radially of housing 30. A level sensing float 120 is secured on the opposite end of rod 118 to follow the level of liquid fuel in tank 22. As float 120 moves up and down with changing fuel level, it turns actuating plate 110 about axis 81, as suggested by arrow 121.

Figure 17:
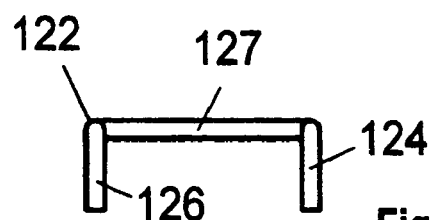
FIG. 17 is top view of FIG. 16.
Figure 18:
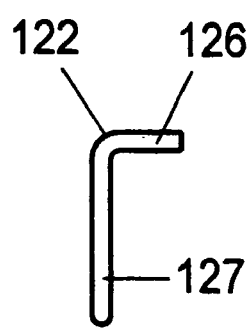
FIG. 18 is a left side view of FIG. 16.
Figure 16:
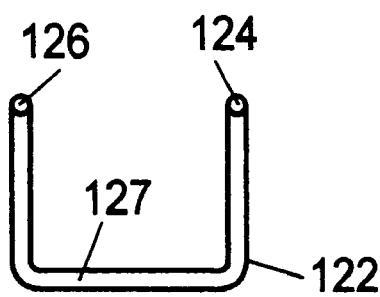
FIG. 16 is a view in the same direction as the view of FIG. 2 showing a magnet return conductor by itself on a slightly smaller scale than FIG. 2.

Actuating plate 110 carries a magnet return conductor 122 that is shown by itself in FIGS. 16–18. Magnet return conductor 122 comprises a formed metal wire, or rod, of circular cross section that is formed to a shape that provides opposite end segments 124, 126 that, when assembled onto actuating plate 110, overlap, with suitable radial clearance, the exterior of larger diameter portion 40 of housing perimeter wall 34. Segments 124, 126 are parallel with axis 81, and are located 180° about axis 81. With segments 124, 126 so disposed, magnet 54 aligns between them, with tip end 56 confronting segment 124 and tip end 58 confronting segment 126. Magnetic flux from one of the magnet poles passes through the non-magnetic housing perimeter wall to the confronting one of the magnet return conductor segments. A yoke portion 127 of magnet return conductor 122 extends between segments 124, 126 to provide a return path for magnetic flux from one segment to the other. At the other segment, the flux passes back through the housing wall to the other magnet pole.

The circularly contoured perimeter edge of the large end of actuating plate 110 comprises two generally semi-circular notches 128, 130 diametrically opposite each other about axis 81. Those notches locate and seat magnet return conductor 122 on the large end, as shown by FIGS. 2-5, so that as actuating plate 110 turns on enclosure 31 about axis 81, segments 124, 126 similarly turn about the same axis. Because magnet 54 continually seeks alignment between segments 124, 126, the motion that actuating plate 110 imparts to magnet return conductor 122 causes movement 52 to follow the actuating plate movement. And because actuating plate 110 follows movement of float 120, movement 52 is forced to follow the level of liquid fuel in tank 22.

Figure 13:
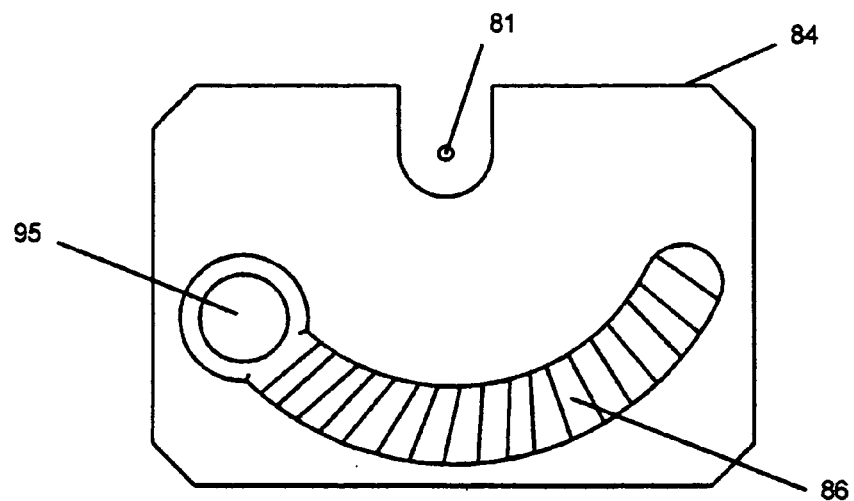
FIG. 13 is a view in the same direction as the view of FIG. 11 on an enlarged scale showing, by itself, a resistor card that mounts on the cover.

As shown by FIGS. 11 and 13, the length of resistor 86 runs along an arc that is generally circular about axis 81. Rivet 92 establishes electrical connection of one end of resistor 86 to terminal 97. Movement 52 is effective to position contact 70 along resistor 86 at various distances from rivet head 94 in correspondence with fuel level. The amount of resistance present between rivet 92 and contact 70 corresponds to the level of fuel sensed by float 120. Contact 70 is electrically connected to ground via grounding of contact arm 62 to housing 30 through bracket 60 and eyelet 54, with eyelet 54 being urged into contact with housing rear wall 32 by the magnetic attraction to return conductor 127 and by the force by the resiliently flexed contact arm 62 to keep the rolled-over eyelet end at the rear face of magnet 54 in continual contact with wall 32, even as movement 52 turns within enclosure 31.

Grounding of housing 30 is accomplished through a conductive electric terminal 132 (FIGS. 1–5) that is affixed to the exterior of housing perimeter wall portion 40. An intermediate portion 133 of the terminal is curved for conformance to the housing perimeter wall where it is affixed to the housing in any suitable manner such as welding. At one end the terminal has an upturned blade 134, and at the other end, a short upturned tab 136. Blade 134 is adapted for mating connection with a wiring terminal (not shown) of the electrical system. Blade 134 presents an interference to magnet return conductor segment 126 for limiting circumferential travel of actuating plate 110 in the clockwise direction, as viewed in FIGS. 2 and 4 when abutted by that segment. Tab 136 presents an interference to segment 124 for limiting circumferential travel of actuating plate 110 in the counterclockwise direction when abutted by that segment.

Turning of movement 52 within enclosure 31 can be damped and lubricated by filling the interior with a light oil, thereby immersing movement 52 and resistor 86 in a fluid medium, as mentioned earlier. Calibration of sender 26 occurs after cover placement, but before the housing is crimped onto the cover.

Calibration is performed with the aid of suitable equipment. First, before attaching float rod 118 to actuating plate 110, the resistance measured between terminals 132 and 97 must be properly correlated with the position of actuating plate 110. The proper resistance can be set for extra close tolerance for a low fuel signal point, such as empty, by holding actuating plate 110 at a particular position about axis 81 referenced to terminal 132, turning the cover via ridge 108 to obtain the proper resistance, and then crimping housing 30 to cover 28, as described above, to prevent cover turning. With this calibration, proper orientation of the sender in a fuel tank, or on a fuel module, uses terminal 132 as the reference. With the resistance having been properly correlated with actuating plate position, float 120 is placed at the low fuel, or other, level, actuating plate 110 is turned to provide the corresponding resistance across terminals 132, 97, and the opposite end of float rod 118 is secured to actuating plate 110, such as by welding.

When sender 26 is installed in a fuel tank, float 120 will move up and down with changing fuel level. As a result, rod 118 turns actuating plate 110, and hence magnet return conductor 122, on enclosure 31 about axis 81. Movement 52 tracks return conductor 122 to correspondingly position contact 70 along resistor 86, causing resistance between terminals 97 and 132 to indicate the fuel level. The arrangement of various parts in the particular embodiment of sender 26 illustrated here provides that contact 70 is essentially midway along the arcuate length of resistor 86 when actuating plate 110 and magnet return conductor 122 are midway between limits of travel constrained by blade 134 and tab 136. When the fuel level falls to empty, the moving parts of sender 26 assume the solid line position shown in FIG. 1 where segment 124 is close to tab 136. When the fuel level rises to full, they assume the broken line position where segment 126 is close to blade 134. The travel allowed by blade 134 and tab 136 assures that contact 70 remains on resistor 86 for all positions of actuating plate 110. Hence, when the tank is empty, resistance between terminals 97 and 132 will be at its minimum reading; when the tank is full, resistance will be at maximum reading. A reverse of the resistance signal can be developed by making contact from terminal 95 to the far end of resistor 86 via a printed circuit buss bar on resistor card 84.

It is believed that the sender that has been described herein provides significant improvements in performance and durability that are quite cost-effective. The magnet can be economically fabricated by known magnet fabrication technology, magnet molding technology in particular being contemplated. The metal parts, such as the housing, actuating plate, and the contact arm and its mounting bracket can be fabricated from conventional materials using conventional metalworking techniques. The cover can be molded by conventional molding techniques to include the various features described.

Tight dimensional tolerances in a mass-produced bent wire part may be costly to achieve. Dimensional tolerances for the formed wire magnet return conductor 122 however need not be especially strict. It is the precision in stamping notches 128, 130 in the perimeter of actuating plate 110 that enable conductor 122 to have less strict tolerance because it is the notches that will control the locations of end segments 124, 126. Yoke portion 127 need merely allow member 122 to expand from its free unstressed state to spread end segments 124, 126 sufficiently apart to enable them to fit over actuating plate 110 so that when the wire is thereafter allowed to relax, the energy that has been imparted to the wire by expanding it will result in the yoke portion exerting retention force on the end segments urging them into the respective notches and thereafter keeping them in place in the notches. To the extent that such retention force may be considered insufficient, member 122 may be mechanically secured to actuating plate 110 by any suitable means, such as welding, or providing features in the actuating plate that are deformed or bent onto member 122.

It is possible to minimize movement hysteresis and maximize movement accuracy by making the radius of curvature of each magnet tip end 56, 58 equal to the radius of curvature of the outside diameter of the wire forming magnet return conductor 122.

The movement damping provided in the inventive sender may be especially desirable for significantly attenuating the effect of float flutter on the resistance output of the sender.

Figure 19:
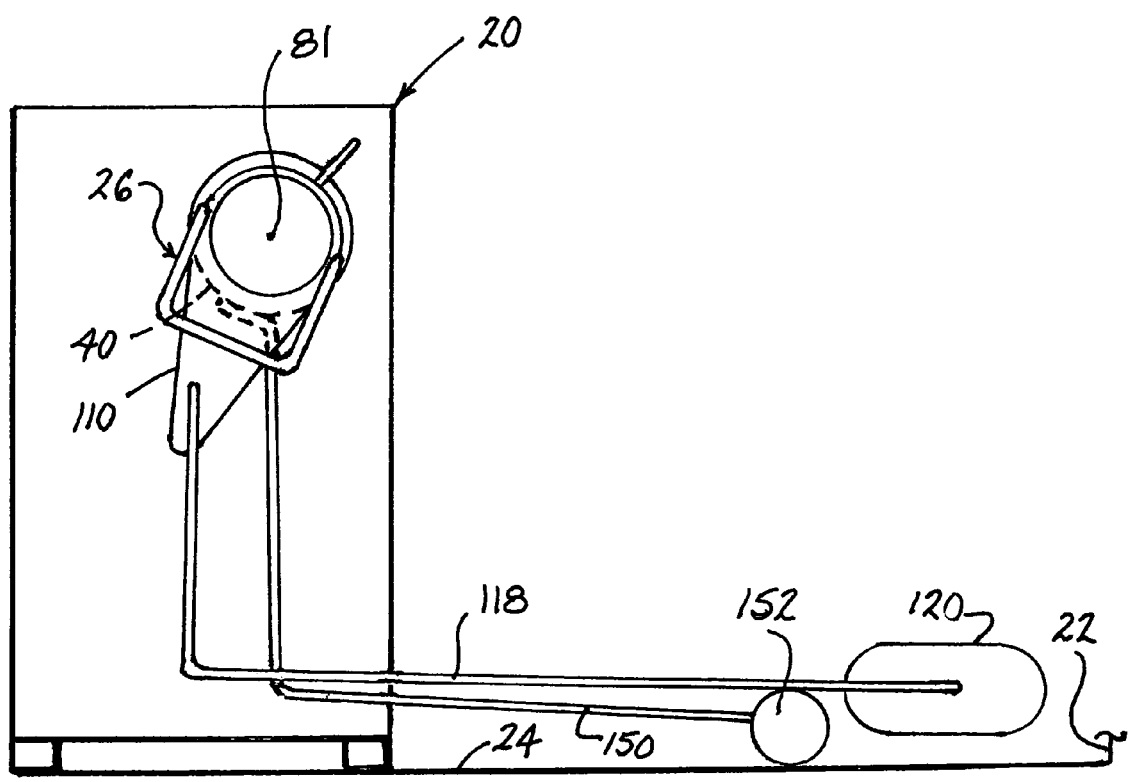
FIG. 19 is a view like FIG. 1, but with the sender having the bottom referencing feature.

FIG. 19 illustrates a fuel pump module in a tank as in FIG. 1, but with the sender having the bottom referencing feature. Except for the bottom referencing feature, sender 26 in FIG. 19 is like sender 26 in previous Figures. The hermetically sealed enclosure 31 is disposed in a mounting in a fuel pump module 20, for some degree of turning about a generally horizontal axis that is substantially coincident with axis 81.

A bottom reference rod 150 extends from the enclosure exterior toward bottom wall 24 of tank 22. A proximal end of rod 150 is formed for fitting to and joining with wall portion 40 of casing 30. A stop 152 is mounted on the distal end of rod 150. Rod 150 and stop 152 form a lever whose weight acts to turn enclosure 31 in a clockwise sense about axis 81 when immersed in liquid fuel. Enclosure 31 is mounted in pump module 20 to allow for at least some degree of turning about axis 81 within its mounting.

In installed position shown in FIG. 19, sender 26 is disposed such that stop 152 rests on tank bottom wall 24 at a distance from axis 81. The rod of the rod and stop create a moment arm that circumferentially positions enclosure 31 in its mounting on module 20 about axis 81. Float rod 118 and float 120 operate the movement 52 according to the fuel level in tank 22.

Because of the ability of enclosure 31 to be positioned in its mounting by bottom reference rod 150 and stop 152, the electric resistance presented by the sender when float 120 is at a zero fuel level corresponding to the tank being empty is rendered essentially independent of the distance of enclosure 31 above tank bottom wall 24. This essentially removes that distance as an influence on the sender's accuracy in indicating the empty level, and inherently enhances the sender accuracy as fuel level approaches empty, the most critical part of the range for the driver.

While a presently preferred embodiment has been illustrated and described, it is to be appreciated that the invention may be practiced in various forms within the scope of the following claims.

What is claimed is:

1. A fuel level sender disposed within a fuel tank for signaling the level of liquid fuel in the tank comprising:
    an enclosure that is disposed in a mounting at a distance above a bottom wall of the tank and has an interior that is hermetically sealed against intrusion of both liquid fuel and fuel vapor;
    an actuator that is positionable on an exterior of the enclosure in correlation with liquid fuel level;
    a movement within the interior of the enclosure that follows the positioning of the actuator;
    a bottom referencing member that circumferentially positions the enclosure within the mounting to reference the circumferential position of the enclosure to the bottom wall of the tank; and
    an electric circuit element within the interior of the enclosure that is operated by the movement to provide an electric characteristic for transmission through the enclosure to signal the liquid fuel level.

2. A sender as set forth in claim 1 wherein the actuator, the movement, and the enclosure are arranged for circumferential positioning about a common axis.

3. A sender as set forth in claim 1 wherein the bottom referencing member causes the electric circuit characteristic provided by the electric circuit element to signal zero fuel level when the bottom referencing member is referencing the bottom wall of the tank and the actuator is at a position corresponding to zero fuel level in the tank.

4. A sender as set forth in claim 3 wherein the actuator is arranged for circumferential positioning on the enclosure.

5. A fuel level sender disposed within a fuel tank to signal the level of liquid fuel in the tank comprising:
    a mounting containing an electric circuit element that is disposed at a distance above a bottom wall of the tank and that has a first part that is positionable circumferentially on the mounting;
    an actuator that is positionable in correspondence with liquid fuel level for positioning a second part of the electric circuit element relative to the first part; and
    a bottom referencing member for positioning the first part of the electric circuit element circumferentially on the mounting to cause an electric circuit characteristic provided by the electric circuit element to signal zero fuel level when the bottom referencing member is referencing the bottom wall of the tank and the actuator is at a position corresponding to zero fuel level in the tank.

6. A sender as set forth in claim 5 wherein the mounting comprises an enclosure that encloses the first and second parts of the electric circuit element within an interior that is hermetically sealed against intrusion of both liquid fuel and fuel vapor.

7. A sender as set forth in claim 6 wherein the first part of the electric circuit element comprises one of a commutator and track, and the second part of the electric circuit element comprises a contact arm that is positionable along the one of the commutator and track.

8. A sender as set forth in claim 6 wherein both the first part and the second part are arranged for circumferential positioning about a common axis.

9. A method for referencing a fuel level sender of the type that signals the level of liquid fuel in a motor vehicle fuel tank and comprises an enclosure that is disposed within a mounting above a bottom wall of the tank and has an interior containing a movement that turns about an axis in correlation with the turning of an actuator on an exterior of the enclosure about the axis in accordance with liquid fuel level and an electric circuit element that is disposed within the interior of the enclosure and associated with the movement to provide an electric characteristic for transmission through the enclosure to signal the liquid fuel level, the method comprising:
    circumferentially positioning the enclosure within the mounting in correlation with the bottom wall of the tank.

10. A method as set forth in claim 9 in which the step of circumferentially positioning the enclosure within the mounting in correlation with the bottom wall of the tank comprises circumferentially positioning the enclosure within the mounting by a lever that is joined at one end to the enclosure and engages the bottom wall at an opposite end.

* * * * *